H. CUTLER.
TROLLEY WHEEL CONSTRUCTION.
APPLICATION FILED APR. 13, 1910.
1,061,989.
Patented May 20, 1913.
2 SHEETS—SHEET 1.
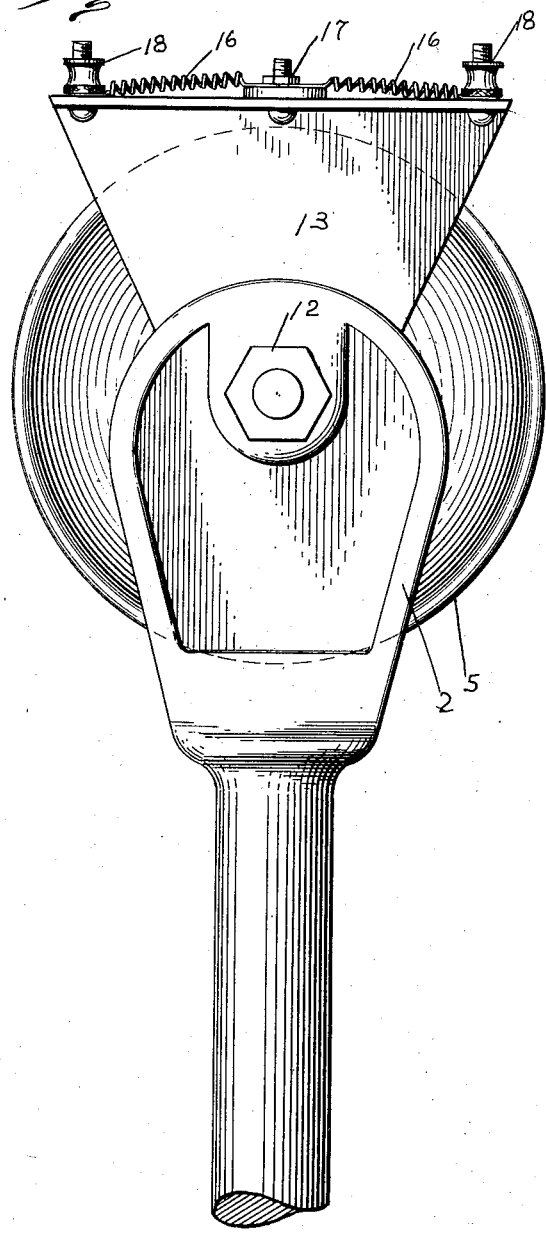
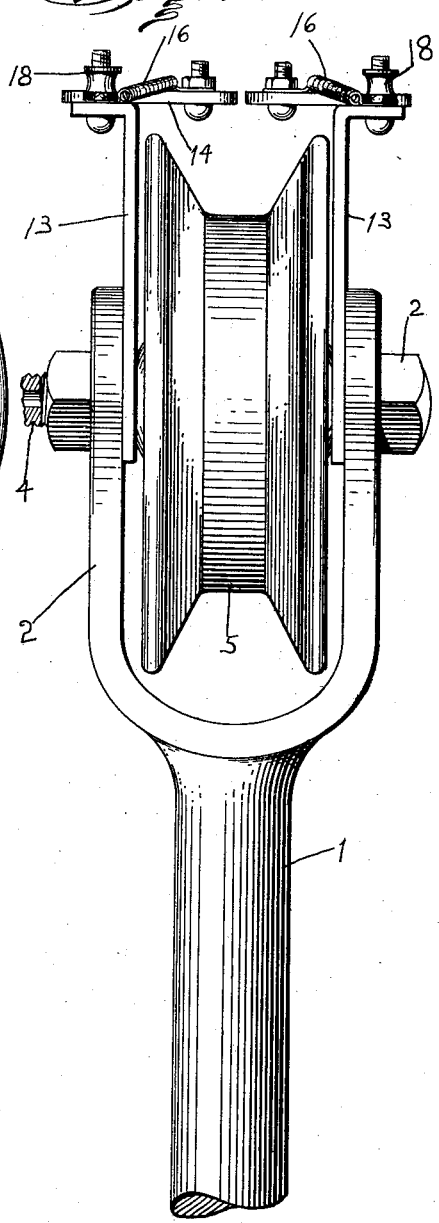

H. CUTLER.
TROLLEY WHEEL CONSTRUCTION.
APPLICATION FILED APR. 13, 1910.
1,061,989.
Patented May 20, 1913.
2 SHEETS—SHEET 2.
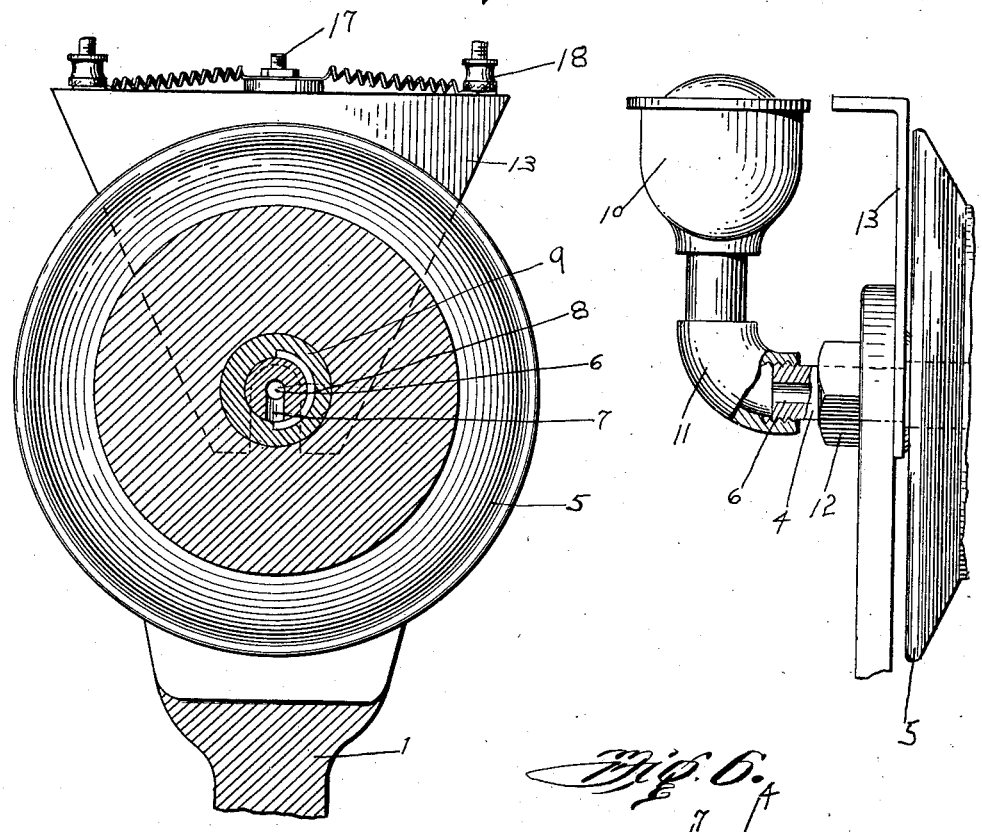
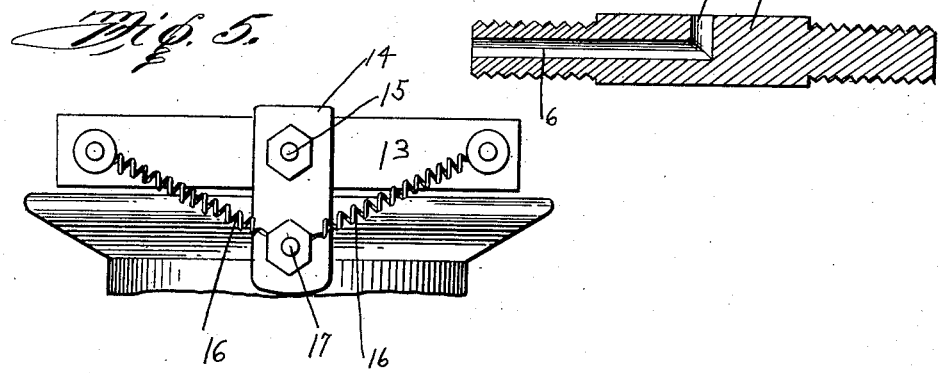
Witnesses
Inventor
Harry Cutler
by
Attorney

UNITED STATES PATENT OFFICE.

HARRY CUTLER, OF PITTSBURGH, PENNSYLVANIA.

TROLLEY-WHEEL CONSTRUCTION.

1,061,989.  Specification of Letters Patent. Patented May 20, 1913.

Application filed April 13, 1910. Serial No. 555,142.

*To all whom it may concern:*

Be it known that I, HARRY CUTLER, citizen of the United States, residing at Pittsburgh, in the county of Allegheny and State of Pennsylvania, have invented certain new and useful Improvements in Trolley-Wheel Constructions, of which the following is a specification.

This invention relates to improvements in trolley wheel constructions and in the means for holding the trolley wheel in operative engagement with the conductor wire.

One of the objects of the invention is the construction of a trolley wheel having an improved lubricating system.

Another object of the invention is the construction of a trolley wheel having means mounted on its support for holding the wheel to the conductor wire adapted to allow the wheel to pass over a cross connection.

With the above and other objects in view the invention comprises certain combinations, constructions and arrangements of parts clearly described in the following specification and clearly illustrated in the accompanying drawings illustrating the invention and forming part of the specification, and in which, Figure 1 is a side elevation, Fig. 2 is an end elevation, Fig. 3 is a vertical sectional view, Fig. 4 is a detail view partly in section showing the lubricator cup and its connection with the wheel shaft, Fig. 5 is a detail plan view of one of the wire guards, and Fig. 6 is a detail longitudinal sectional view of the wheel shaft.

Referring to the accompanying drawings illustrating the preferred form of the invention 1 denotes the trolley pole, the upper end of which is bifurcated to form parallel bearings 2 and 3. A shaft 4 is secured on the bearings 2 and 3 for supporting the trolley wheel 5. This shaft is provided with a passage 6 which extends through one end thereof and terminates in a lateral offset or discharge port 7, located midway of the ends of the shaft. The port 7 communicates with the radial slot 8 of the wheel hub 9, whereby oil which will be conducted from cup 10 may lubricate the wheel. The cup 10 is connected to the shaft 4 by the elbow 11. Nuts 12 hold the shaft 4 on the bearings 2 and 3. Between the inner walls of the bearings 3 and 4 and the adjacent ends of the wheel 5 the brackets 13, the lower ends of which are bifurcated to fit on the shaft 4, are mounted against movement, being held by the clamping action of the nuts. The upper ends of the brackets 13, which consist of flat plates, are bent outwardly to support the wire guards 14, which are pivotally secured by the screw bolts 15 thereto. The guards 14 normally project inwardly toward a common point over the wheel 5 so as to cover the conductor wire and prevent the wheel from jumping therefrom. The guards are held in the normal guarding positions by means of springs 16. Two springs are secured to each guard by the screw posts 17, the remaining ends of which are secured to the plates or brackets 13 by the binding posts 18.

When the trolley wheel is jarred so that it "jumps" the conductor or trolley wire the guards 14 will prevent the wheel from becoming entirely disengaged therefrom, by forming stops for the lateral and downward movement of the wheel. When the wheel passes over a connection, such as is common at crossings the guards will be moved sidewise by the cross wires or connection, automatically returning to their normal positions after the crossing has been passed.

Having described my invention I claim:—

1. A trolley pole, bearings thereon, a shaft mounted thereon, brackets each having an upper surface at right angles thereto said brackets mounted on said shaft, a wheel mounted on said shaft, between said brackets, and guards pivoted to the brackets and bearing on the right angular upper surfaces thereof, springs operating said guards, said springs secured to the free ends of said guards and to the right angular surfaces of said brackets.

2. A device as described consisting of a trolley pole, bearings thereon, a shaft having its ends reduced to form shoulders, brackets mounted between said shoulders and bearings, a wheel on said shaft, said brackets having horizontal flanges, guards pivotally mounted on said flanges, a plurality of springs for controlling each of said guards, said springs engaging the opposite ends of said flanges respectively and being connected at one point to the guards respectively.

In testimony whereof I affix my signature in presence of two witnesses.

HARRY CUTLER.

Witnesses:
 Jos. WECKERLE,
 OSCAR J. CAMPBELL.